United States Patent [19]

Chaki et al.

[11] 4,232,316
[45] Nov. 4, 1980

[54] AIRCRAFT LANDING-GUIDING APPARATUS

[75] Inventors: Eiichi Chaki, Kamakura; Taneaki Chiba, Yokohama; Tetsuo Sato, Funabashi, all of Japan

[73] Assignee: Tokyo Shibaura Denki Kabushiki Kaisha, Kawasaki, Japan

[21] Appl. No.: 964,521

[22] Filed: Nov. 29, 1978

[30] Foreign Application Priority Data

Dec. 5, 1977 [JP] Japan .................................. 52-145808

[51] Int. Cl.³ ............................................. H04B 7/00
[52] U.S. Cl. ......................... 343/108 R; 343/100 SA
[58] Field of Search ............... 343/108 R, 100 SA, 854

[56] References Cited

U.S. PATENT DOCUMENTS

| | | | |
|---|---|---|---|
| 3,518,673 | 6/1970 | Hakonsen | 343/108 R |
| 4,012,739 | 3/1977 | Höfgen et al. | 343/108 R |

*Primary Examiner*—Theodore M. Blum
*Attorney, Agent, or Firm*—Cushman, Darby & Cushman

[57] ABSTRACT

An aircraft landing-guiding apparatus having an antenna system constituted by a plurality of antenna elements arranged in a line and intersecting the course of a runway substantially at right angles at the lengthwise center of the runway.

Phases of sideband signals and carrier signals are shifted at rates having such relationship that sideband patterns and carrier patterns are sent forth from the antenna system at prescribed horizontal angles to the course of the runway.

6 Claims, 4 Drawing Figures

AIRCRAFT LANDING-GUIDING APPARATUS

This invention relates to an aircraft landing-guiding apparatus adapted for use with an instrument landing system (abbreviated as "ILS").

The ILS is installed in an airport as an aid to the final entry of aircraft into the runway thereof and its landing thereon, and furnishes the aircraft with guiding information. With the prior art ILS, a localizer is set at a point some way apart from the forward end of the runway on an extension of the center line of the runway, and a middle marker and outer marker are positioned at points some way apart from the rear end (aircraft entry end) of the runway on extension of its center line in the order mentioned as counted from the rear end, further, a glide path is provided on the lateral side of the runway. The localizer is so designed as to send forth radio waves defining a substantially horizontal entry course of aircraft. The height of a localizer antenna as measured from the ground is prescribed to fall within the range of 2% of a distance between the forward end of the runway and the localizer in order to be prevented from obstructing the takeoff and landing of aircraft.

Therefore, a localizer having a height of, for example, 3 meters, is set at a point more than 150 meters apart from the forward end of the runway. Radio waves issued from the localizer define the so-called clearance region, both edge lines of which define a horizontal angle of ±35° with the center line of the runway. The localizer included in the prior art ILS has to be positioned considerably apart from the forward end of the runway. Where, therefore, an airport has a narrow area, and an undesirable topography, and consequently has only room for the construction of a runway, then it is often difficult to obtain a space for the building of a localizer antenna. Particularly where an airport has to be established in such locality as has a narrow flatland and lies near hills and sea shores, the difficulties arise in constructing a long runway, and still greater difficulties are presented in installing an aircraft landing-guiding apparatus such as a localizer. When a localizer pattern acting only in one direction is produced with respect to a runway constructed in a district where climatic conditions often rapidly change, then aircraft must carry out takeoff and landing only in one direction, resulting in considerable inconvenience.

It is accordingly the object of this invention to provide an aircraft landing-guiding apparatus which can be easily installed in a narrow airport and produce localizer patterns acting in a plurality of directions.

According to this invention, there is provided on acicraft landing-guiding apparatus whose localizer is constructed on the lateral side of a runway and is designed to issue radio waves having a directionality clossing to the runway by a predetermined small angle.

This invention can be more fully understood from the following detailed description when taken in conjunction with the accompanying drawings, in which:

FIG. 1 schematically shows the arrangement of an aircraft landing-guiding apparatus embodying this invention;

Figure 1:
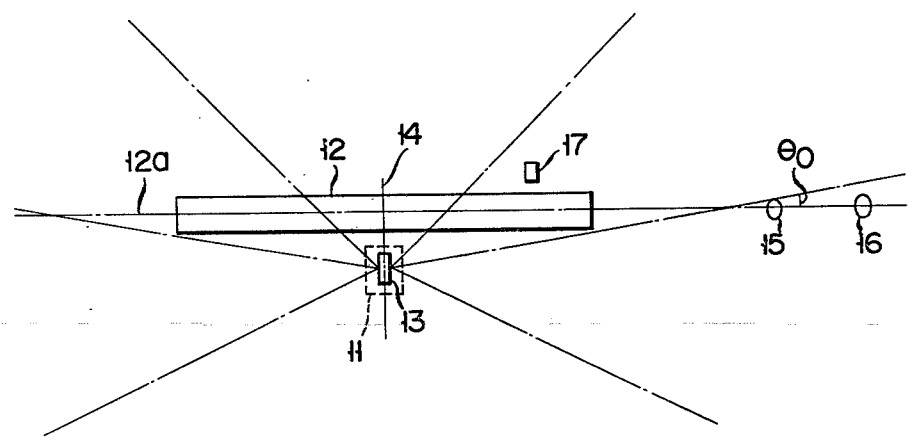

Referring to FIG. 1, a localizer transmitter 11 is provided on the lateral side of a runway of an airport, that is, in the so-called offset arrangement. An antenna system 13 of the localizer transmitter 11 is arranged in a line 14 intersecting to center line 12a of a runway 12 substantially at right angles at the lengthwise center thereof. The antenna system 13 is formed of a plurality of antenna elements arranged along the line 14 and radiating radio waves from both sides like a dipole antenna, V-ring antenna or Yagi antenna. A middle marker 15 and outer marker 16 are arranged on an extension of the center line of the runway 12 at points apart from the rear end (aircraft entry end) of the runway in the order mentioned as counted from the rear end. Further, a glide path transmitter 17 is positioned on the lateral side of the runway 12.

Figure 2:
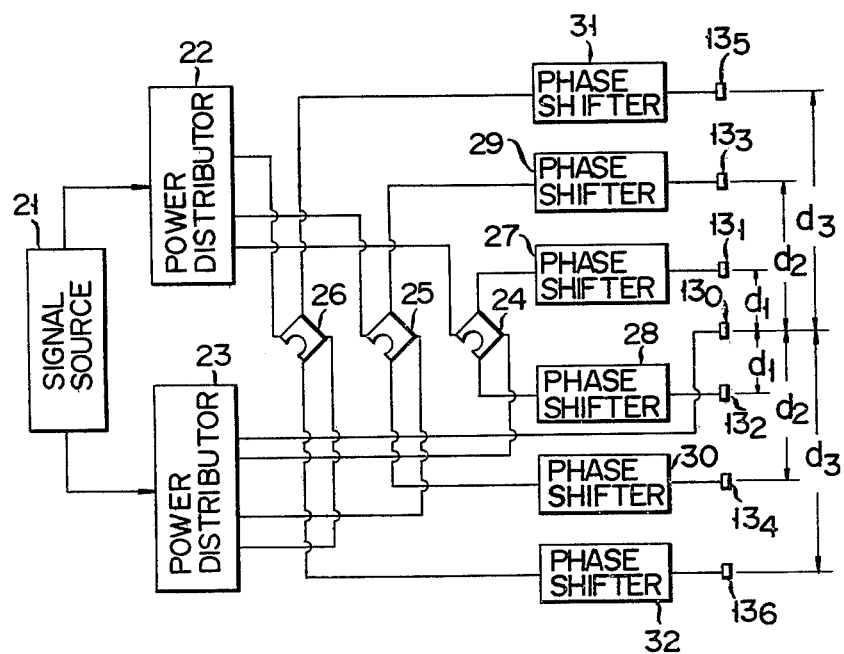
FIG. 2 is a block circuit diagram of a transmission unit included in the localizer of FIG. 1.

The localizer transmitter 11 has a circuit arrangement shown in FIG. 2. A signal source 21 is connected to a sideband power distributor 22 and carrier power distributor 23. A plurality of output terminals of each of the sideband power distributor 22 and these of the carrier power distributor 23 are connected to the corresponding bridge circuits 24, 25, 26. The two output terminals of the bridge circuit 24 are connected to two phase shifters 27, 28; the two output terminals of the bridge circuit 25 to two phase shifters 29, 30; and the two output terminals of the bridge circuit 26 to two phase shifters 31, 32. The output terminals of the phase shifters 27 to 32 are connected to the corresponding antenna elements $13_1$, $13_2$, $13_3$, $13_4$, $13_5$, $13_6$ respectively. A central antenna element $13_0$ is directly connected to the carrier power distributor 23.

Figure 3:
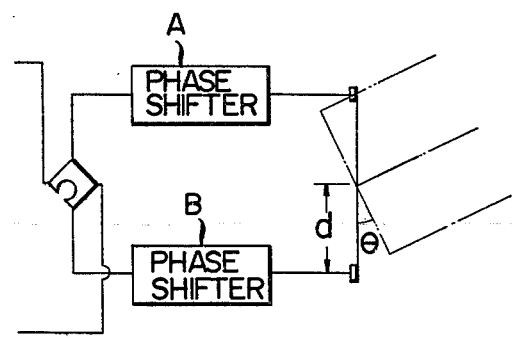
FIG. 3 illustrates the directionality of electric wave emitted by a localizer included in the circraft landing-guiding apparatus of FIG. 1.

With the above-mentioned arrangement, a sideband signal and carrier signal delivered from the signal source 21 are respectively supplied to the sideband power distributor 22 and carrier power distributor 23. A sideband signal conducted to the sideband power distributor 22 is divided thereby into three signal components in a prescribed ratio. The three divided signal components of the sideband signal are supplied to the corresponding bridge circuits 24, 25, 26. A carrier signal transmitted to the carrier power distributor 23 is divided thereby into four signal components one of the four divided signal components of the carrier signal is directly conducted to the central antenna element $13_0$ of the antenna 13. The other divided signal components of the carrier signal are sent forth to the corresponding bridge circuits 24, 25, 26, where the divided signal components of the sideband signal and carrier signal are synthesized. Six output synthesized signal from the bridge circuits 24, 25, 26 and supplied to the corresponding six phase shifters 27 to 32. These phase shifters 27 to 32 are designed to carry out phase shifting at rates having such relationship as causes radio waves issued from the antenna elements $13_0$ to $13_6$ to travel in a direction inclined toward the runway 12. If, in this case, the antenna system 13 of the antenna elements $13_0$ to $13_6$ is offset relative to the center line 12a of the runway 12, a deviation in the horizontal angle of an antenna pattern (i.e. the directionality of radio waves emitted from the antenna $13_0$ to $13_6$) should be less than 3° under the rules of Federal Aviation Administration (FAA). Where a carrier pattern corresponding to a carried signal has a horizontal angle $E_c(\theta)$ and a sideband pattern corresponding to a sideband signal has a horizontal angle $E_s(\theta)$, then the rate at which signal phase are shifted by the phase shifters is determined as follows. Referring to FIG. 3, with $\theta$ taken to denote an angle at which a radio wave is inclined to the direction in which antenna elements are arranged, and $\phi$ taken to represent the rate of phase shifting by the phase shifters A, B, then the horizontal angles $E_c(\theta)$, $E_s(\theta)$ of the carrier pattern and sideband pattern are determined from the following equation (1), (2) respectively.

$$E_c(\theta) = e^{-j(d\sin\theta+\phi)} + e^{j(d\sin\theta+\phi)} = 2\cos(d\sin\theta+\phi) \quad (1)$$

$$E_s(\theta) = e^{-j(d\sin\theta+\phi)} + e^{j(d\sin\theta+\phi)} = 2j\sin(d\sin\theta+\phi) \quad (2)$$

Assuming the offset angle $\theta_o$ (FIG. 2) to be 2°, the angle $\theta$ of FIG. 3 may be substituted by the offset angle $\theta_o$. Since the level $E_c(\theta_o)$ of an electric field acting in the direction of the sideband pattern at an angle of $\theta_o$ is reduced to zero, the following equation results.

$$E_s(\theta_o) = 2\cos(d\sin\theta_o + \phi) = 0 \quad (3)$$

Since $d\sin\theta_o + \phi = 0$, the rate $\phi$ of phase shifting by the phase shifter may be expressed as follows:

$$\phi = -d\sin\theta_o$$

To realize $\theta_o = 2°$, let it be assumed that $d_1$, $d_2$, $d_3$ of FIG. 2 respectively indicate $0.5\lambda$, $1.25\lambda$ and $2\lambda$. Then, the corresponding phase-shifting rates $\phi_1$, $\phi_2$, $\phi_3$ show the following values:
$\phi_1 = 6.28°$
$\phi_2 = 15.70°$
$\phi_3 = 25.12°$ When the above values are allotted to the phase shifters $13_1$ to $13_6$ of FIG. 2. then the rates of those shifting by the phase shifters 27 to 32 run as follows.

Figure 4:
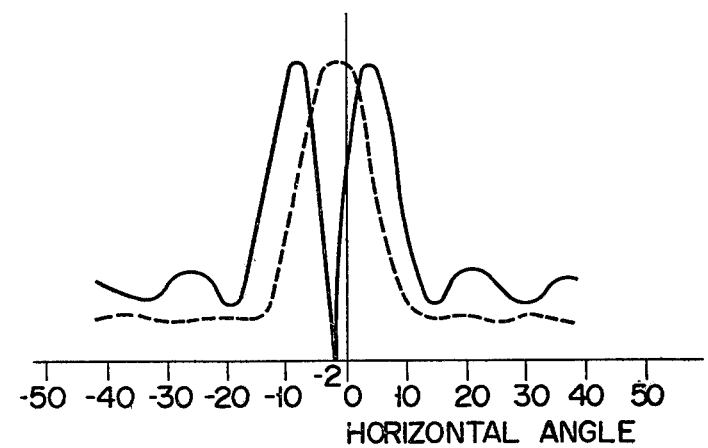
FIG. 4 indicates a pattern of radio waves sent forth by the localizer.

| Phase shifters 27, 28 | $\phi = 6.28°$ |
| Phase shifters 29, 30 | $\phi = 15.70°$ |
| Phase shifters 31, 32 | $\phi = 25.12°$ |

Where the rates of phase shifting by the phase shifters 27 to 32 are set at the above values, then a sideband electric field (solid line in FIG. 4) and a carrier electric field (broken line in FIG. 4) produced by the antenna system 13 cause a localizer pattern whose center line is now deviated from the original center line by −2° to be simultaneously sent forth from both sides of the antenna system 13.

When, according to this invention, the phase shifters are designed to carry out phase shifting at the rates having a prescribed relationship and an antenna like the dipole type is applied which issues radio waves from both sides, then the antenna system 13 sends forth radio waves travelling at a prescribed angle to the center line 12a of the runway 12 toward both forward and rear ends of the runway 12. As a result, the aircraft landing apparatus embodying this invention can furnish an incoming airplane with information on the direction as effectively as the prior art aircraft-landing apparatus whose localizer antenna is built on an extension of the center line 12a of the runway 12a. Moreover, the aircraft landing-guiding apparatus of the invention transmits a localizer pattern to an airplane, whether it lands on a runway 12 from the forward or the rear end thereof, thereby enabling the runway to the utilized over the prominantly broadened range of operation conditions.

With the foregoing embodiment, this invention is practiced by attaching a phase shifter to a localizer included in the prior art ILS. However, the aircraft landing-guiding apparatus of the invention is also applicable to, for example, a microwave landing system (MLS). Since, in this case, arrangements are already made to allow for the landing of aircraft in two opposite directions, a group of antenna elements included in the MLS is positioned on the lateral side of a runway and arranged in a direction intersecting a runway substantially at right angles. Therefore, the antenna assembly emits electric waves from both sides.

The antenna assembly need not be set at that point on the lateral side of a runway which corresponds to its lengthwise center, but well serves the purpose, provided the assembly is built anywhere on the lateral side of the runway. Further, the antenna assembly need not be arranged in a direction intersecting the runway substantially at right angles. The point is that an antenna pattern produced has a horizontal angle whose deviation falls within a range specified by the Federal Aviation Administration.

What we claim is:

1. An aircraft landing-guiding apparatus comprising:
   an antenna system constituted by a plurality of antenna elements arranged on the lateral side of a runway and aligned in a direction intersecting its course substantially at a right angle for radiating a sideband pattern and carrier pattern from both sides alike;
   means for generating a sideband signal and carrier signal; and
   phase-shifting means coupled to each antenna element for shifting the phases of the sideband signal and carrier signal coupled thereto at a predetermined rate so as to cause the directionality of the sideband pattern and that of the carrier pattern to intersect the runway course at prescribed angles.

2. The aircraft landing-guiding apparatus according to claim 1, wherein the means for generating the sideband signal and carrier signal comprises:
   power distributors for dividing the sideband signal and carrier signal, and
   a plurality of bridge circuits for synthesizing the divided signal components of the sideband and carrier signals delivered from the power distributors; and
   wherein the phase-shifting means are formed of a plurality of phase shifters for shifting the phases of output synthesized signal components from the bridge circuits.

3. The aircraft landing-guiding apparatus according to claim 1 or 2, wherein the antenna elements constituting the antenna system are arranged in a line intersecting the course of the runway substantially at right angles at the lengthwise center of the runway.

4. The aircraft landing-guiding apparatus according to claim 1 or 2, wherein the antenna elements are dipoles.

5. The aircraft landing-guiding apparatus according to claim 1 or 2, wherein the antenna elements collectively constitute a Yagi antenna.

6. The aircraft landing-guiding apparatus according to claim 1 or 2, wherein the antenna elements respectively constitute V-ring antennas.

* * * * *